United States Patent
Buryak et al.

(10) Patent No.: US 8,600,733 B1
(45) Date of Patent: Dec. 3, 2013

(54) LANGUAGE SELECTION USING LANGUAGE INDICATORS

(75) Inventors: Kirill Buryak, Sunnyvale, CA (US); Andrew Swerdlow, San Francisco, CA (US); Luke Hiro Swartz, San Francisco, CA (US); Cibu Johny, Santa Clara, CA (US); Clement Roux, L'Hay-le-Roses (FR)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 13/278,617

(22) Filed: Oct. 21, 2011

Related U.S. Application Data

(60) Provisional application No. 61/491,850, filed on May 31, 2011.

(51) Int. Cl.
*G06F 17/28* (2006.01)
(52) U.S. Cl.
USPC .......................................................... 704/8
(58) Field of Classification Search
USPC .......................................................... 704/8
See application file for complete search history.

(56) References Cited

U.S. PATENT DOCUMENTS

| | | | |
|---|---|---|---|
| 6,438,545 B1 * | 8/2002 | Beauregard et al. ................. 1/1 |
| 7,580,829 B2 * | 8/2009 | James et al. ...................... 704/2 |
| 7,634,397 B2 * | 12/2009 | Suen et al. ........................ 704/8 |
| 2012/0017146 A1 | 1/2012 | Travieso et al. | |

* cited by examiner

*Primary Examiner* — Susan McFadden
(74) *Attorney, Agent, or Firm* — Morris & Kamlay LLP

(57) ABSTRACT

An ordered list of language indicators may be obtained, wherein each of the language indicators is either user defined or system defined. Each language indicator may be ranked according to a priority of the language indicator for determining a most-preferred language for a user. A list of languages may be received that indicates the languages available in an application. The ordered list of language indicators may then be compared to the received languages, and a highest-ranked language indicator determined. The most-preferred language for the user may be selected based upon the highest-ranked language indicator. Information from the application may then be provided to the user in the most preferred language.

19 Claims, 4 Drawing Sheets

FIG. 4

Edit language settings

410  Primary language: [English]

Secondary language: [Russian]

Language exceptions

420  Email application: [Español] remove

Photo editor: [Italiano] remove (Save) (Cancel)

LANGUAGE SELECTION USING LANGUAGE INDICATORS

CROSS-REFERENCE TO RELATED APPLICATIONS

This application claims priority to U.S. Provisional Application No. 61/491,850, filed May 31, 2011, the disclosure of which is incorporated herein in its entirety for all purposes.

BACKGROUND

When a user accesses a web application, the application must determine the appropriate language to use to resolve the application. Generally, an application may resolve a language by using a variety of sources including: a URL parameter, cookies, a browser accept-language, a user agent, a domain, and an IP address. A URL parameter includes computer-readable code, such as "hl=" followed by a language tag, included in a URL to the desired language a user would like a webpage to display. A cookie can include computer-readable code that can transmit state information from a webpage to a user's browser and from a user's browser to the webpage. The "accept-language" computer readable code specifies the languages a browser may use. The languages can be specified in BCP-47 language tags. A user agent can refer to a client application that communicates with a network. A web browser, such as Mozilla, Safari, or Internet Explorer, constitutes a user agent. A domain can refer to an area of control on a network such as the internet. A domain may indicate a language that is available for any traffic in its space. A user's IP address contains information about the location of the user and this information can be used to display a web page based on the geolocation of the user. But using these language indicators alone ignores potential language inputs from the user and other ascertainable sources.

Multilingual individuals may not prefer to use their primary language for a specific application or their primary language may not be available for a specific application. Currently, language selections typically are tied to a web browser or to a specific computing device, and not to the user. For example, a user can make a language selection for a web application and the application may save the user's language selection in a cookie, which can be tied to the computing device the user is using. If the user attempts to utilize the web application from a different computer or if the user clears the web browser's cookies, the user must reenter the language selection for the application upon accessing it again. Likewise, the user might attempt to utilize a second web application that does not support the language the user selected in the first web application. In this case, the user must make a new language selection in the second web application from the available languages. But, some individuals may prefer to use a different language for a specific application. Conventional language selection techniques typically do not allow a user to set such an override; instead, they rely on the user to directly set the language, or use automatic language identifiers or similar techniques to set the language.

BRIEF SUMMARY

According to an embodiment of the disclosed subject matter, an ordered list of language indicators, which may be either user defined or system defined, may be obtained. The ordered list may rank each language indicator according to a priority of the language indicator for determining a most-preferred language for a user. A list of languages may be received. The ordered list of language indicators may be compared to the received languages. A highest-ranked language indicator may be determined from the ordered list of language indicators based upon the comparison and a most-preferred language for the user may be selected based upon the highest-ranked language indicator. Information from the application then may be provided to the user in the most preferred language.

In an embodiment for the disclosed subject matter, a plurality of language indicators may be received, wherein each of may be either user defined or system defined. Languages available for an application may be determined. The plurality of language indicators may be compared to the languages available for an application. A most preferred language may be determined based upon the comparison. Information from the application may be provided to the user in the most preferred language. The most preferred language also may be associated with a user identifier. Both the user identifier and the most preferred language may be stored on a computer readable medium. The plurality of language indicators may include general language preferences of the user, an application-specific language override of the user, one or more application-specific overrides of the user for a second application, or an enterprise administrator language policy setting. The general language preferences may comprise an ordered list of language preferences of the user. The ordered list of language preferences of the user may be associated with an application identifier. The plurality of language indicators may include a system defined language indicator selected from the group consisting of URL parameter, IP address, browser defined language, cookie, or user agent.

In an embodiment of the disclosed system, a database storing a plurality of language identifiers and a processor may be in connection with a database. The processor may be configured to receive a plurality of language indicators, each of which is either user defined or system defined. The processor may be configured to determine languages available for an application and compare the plurality of language indicators to the languages available for an application. The processor may be configured to determine a most preferred language based upon the comparison. The processor may be configured to provide information from the application to the user in the most preferred language. The most preferred language also may be associated with a user identifier. Both the user identifier and the most preferred language may be stored on a computer readable medium. The plurality of language indicators may include general language preferences of the user, an application-specific language override of the user, one or more application-specific overrides of the user for a second application, or an enterprise administrator language policy setting. The general language preferences may comprise an ordered list of language preferences of the user. The ordered list of language preferences of the user may be associated with an application identifier. The plurality of language indicators may include a system defined language indicator selected from the group consisting of URL parameter, IP address, browser defined language, cookie, or user agent.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example of a language preferences configuration page according to an embodiment of the disclosed subject matter.

DETAILED DESCRIPTION

Figure 1:
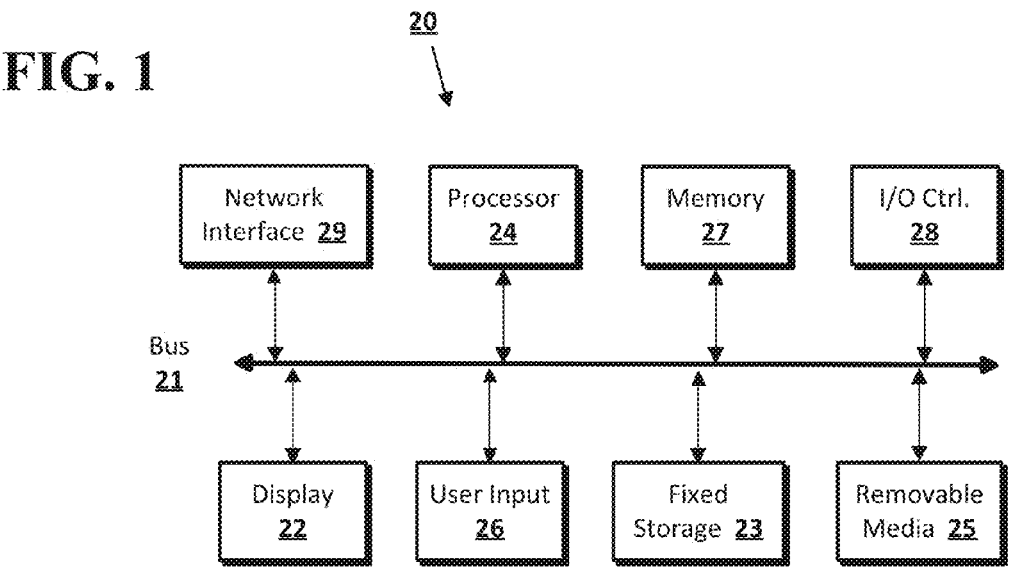
FIG. 1 shows a computer according to an embodiment of the disclosed subject matter.

Embodiments of the presently disclosed subject matter may provide users the ability to establish general language preferences and application-specific language overrides. The incorporation of user defined language indicators and more system defined language indicators may allow an application to more accurately select a language for an application, and may do so without the active input of the user.

In an embodiment of the presently disclosed subject matter, four language indicators may be used, two of which are user defined and two of which are system defined, to enable an application to automatically select a language without the explicit direction of the user. The four language indicators are: (1) user application-specific language overrides, (2) general language preferences, (3) an enterprise administrator's language policy setting, and (4) the most common language override language preference for other products.

In an embodiment of the presently disclosed subject matter, a user's general language preferences and application-specific overrides may be associated with an account of the user to provide an application in a user's desired language. The user may provide (1) general language preferences, which are a prioritized list of languages the user would like to use, and (2) application-specific language overrides. The user's language preferences and overrides may be used to enhance language resolution of an application or a web page by providing the user with the flexibility to view content in multiple languages or use language tools. For example, a web search may present results in one or more of the user's specified languages. Language preferences also may be used to determine whether or not content should be translated to a different language. For example, a translation program may offer to auto-translate languages for webpages that are not in the user's language preferences list. Similarly, other language resolution tools may employ the disclosed subject matter. Two examples of such tools are a spell checker or a text direction tool and either or both may be provided at the user's discretion, based on the languages preferences list. These examples are illustrative only, and other applications similarly may make use of the preferences and overrides disclosed herein.

One or more of the language indicators may be used in addition to or instead of conventional indicators. For example, the following list of language indicators may be examined to make a language selection, in order of decreasing priority: (1) a URL parameter, (2) user application-specific overrides, (3) general user language preferences, (4) cookies, (5) a browser accept-language, (6) language overrides for other applications in descending usage order, (7) a user agent, (8) an enterprise administrator's language policy setting, and (9) an IP address. Language indicators may be used in a variety of ways. For example, they may be used to indicate languages that are available in an application, or to indicate a user's language selection or preference. More generally, language indicators may provide information regarding one or more languages available, preferred, or selected in a given context. A different priority order of the language indicators may be used, and some of the language indicators may be excluded when determining a most preferred language in various embodiments. The languages supported by an application may be compared to the languages available in the various language indicators. Upon encountering the first language indicator that provides a language supported by the application, an application may select a language according to the appropriate language indicator.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
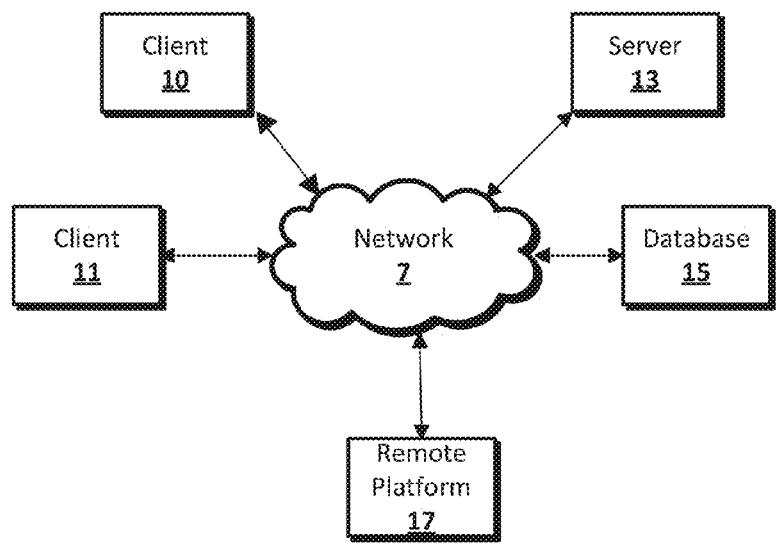
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 3:
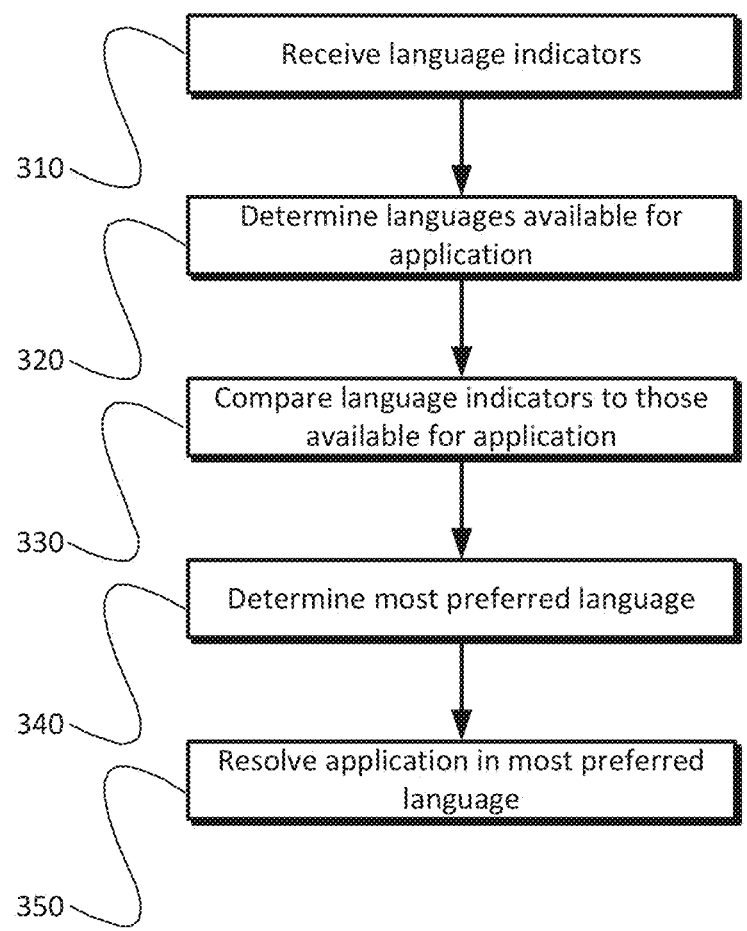
FIG. 3 shows an example arrangement and information flow for a language resolution algorithm according to an embodiment of the disclosed subject matter.

In an embodiment of the disclosed subject matter, shown in FIG. 3, a plurality of language indicators is received 310, wherein each of the plurality of language indicators may be either user defined or system defined. Each language indicator may specify one or more languages. A user defined language indicator may refer to an indicator that requires some input from a user. User defined language indicators may refer, for example, to general language preferences and application-specific language overrides as specified by the user. General language preferences for the user may specify at least one language that is the user's preferred language choice. The user may provide other languages and these languages may be prioritized based on the user's discretion and the capability of the application the user is using to configure language preferences.

In an embodiment of the disclosed subject matter, the user may specify application-specific language overrides. An override functions to supersede the user's general language preferences, regardless of whether the language preferences have been prioritized by the user. For example, a user might provide a general language preferences list that indicates the user prefers applications to be resolved in the following languages, in order, (1) French, (2) German, and (3) Chinese. These preferences will indicate to an application that the user prefers content be provided in French, if available, and in the German language if the French language is unavailable. If the application cannot be provided in both French and German, then the application should attempt to be resolved in Chinese. The user, however, may override this prioritized list for a separate application, such as an email application. Continuing the example above, the user may prefer the English language for his email application, and the list of 1-3 languages for other applications. Thus, the language preferences will be adhered to except for the defined exception of the email application, which will then be provided in English.

The general language preferences and the application-specific language overrides may be stored on a computer readable medium. The language preferences can be stored on a computing device. They may be stored remotely, such as on a server, or locally. The language preferences may be stored and associated with the user's account at a remote location, and, when accessed, may be provided to an application. For example, user language preferences can be maintained on a backend server. The backend server can provide information to an application when the user has logged into an account. The user's language preferences can be made available to any application capable of interacting with the backend server. Thus, the user's language preferences are not tied to a web browser or specific computer. For example, after logging into an account, the user may access an application for the first time on a new computer and the application can provide content in a language appropriate for the user without any further instruction from the user.

Generally, system defined language indicators may refer to those that automatically determine a language in which to resolve an application or web page. A system defined language indicator may refer to a language indicator that does not directly require input received from a user. In some configurations, system defined language indicators may be generated or calculated from other system defined or user defined language indicators. Examples of system defined language indicators may include (1) a URL parameter, (2) cookies, (3) a browser accept-language, (4) language overrides for other applications in descending usage order, (5) a user agent, (6) an enterprise administrator's language policy setting, and (7) an IP address. The enterprise administrator's language policy setting refers to the language set by the administrator of an enterprise. An enterprise can refer to the computing infrastructure at a business. The language selected by the administrator may be utilized default language for computing devices managed by the administrator. An enterprise administrator may set more than one language in the form of a prioritized list.

Referring again to FIG. 3, at 320 languages available for an application may be determined. Typically, an application may specify one or more languages in which it can be provided to a user in the form of language tags, which may include abbreviated language codes as established by The Internet Engineering Task Force ("IETF"). IETF's language tag specification describes the language tag syntax. Languages may be defined in other formats or coding languages, such as the International Organization for Standardization, and still be compatible with the disclosed subject matter. Generally, language tags may represent standardized codes that represent a language. For example, "fr" is a language tag that represents the French language. Applications may support one or more languages, meaning that the application can be resolved in the designated one or more languages.

The plurality of language indicators may be compared to the languages available for an application at 330. The language indicators may be ordered in many possible ways. Once a match is found between a language supported by the application and a language present in a language indicator, the comparison between the one or more languages supported by the application and the languages in the language indicators may be terminated. At 340 a most preferred language may be determined based upon the comparison of the plurality of language indicators to the languages available for an application. Information from the application may be provided to the user in the most preferred language. For example, a browser may receive a request to provide information from the application to the user. Information can include text, graphics, other content capable of receiving language resolution, or any combination thereof.

According to an embodiment of the disclosed subject matter, after determining the most preferred language preference for an application at 340, the application may associate the most preferred language identifier with an application identifier. This association may be formed both from the general language preferences or the language overrides. The application identifier indicates an application for which a language preference has been determined, so that a future determination regarding language preferences is unnecessary for the same application except where the language preferences of the user change. The application identifier and most preferred language also may be associated with a user identifier. The user identifier allows the preference for a particular application to be linked to the user, such as by linking to the user's account on one or more platforms or services. For example, a language selection for a particular application may be stored on a backend server and accessed when the user accesses the account. Thus, in a subsequent session, the application can provide information to resolve content for the user in the selected language without any input from the user.

FIG. 4 displays an example of a language preferences configuration page. A user may enter language preferences when creating an account. The configuration page also may be available any time thereafter in the event the user decides to make alterations to the user's language preferences. The configuration page shown in FIG. 4 displays two sections in which a user may enter language preferences. The "Edit language settings" feature 410 represents a user's general language preferences. In the example shown, a user may set a primary and secondary language. Other language configuration pages may allow a user to specify more languages. Alternatively, a configuration page may allow a user to enter language preferences without prioritizing them. A "Language exceptions" interface 420 may allow a user to specify language overrides to the user's general language preferences. For example, a user account in FIG. 4 has selected Spanish as the preferred language for a mail application, and Italian as the preferred language for a photo editing application. If the user had not specified any Language exceptions 420, then those applications may obey the language preferences as specified in the language settings 410. If a user does not configure language settings, then a default language may be utilized as described herein.

Figure 5:
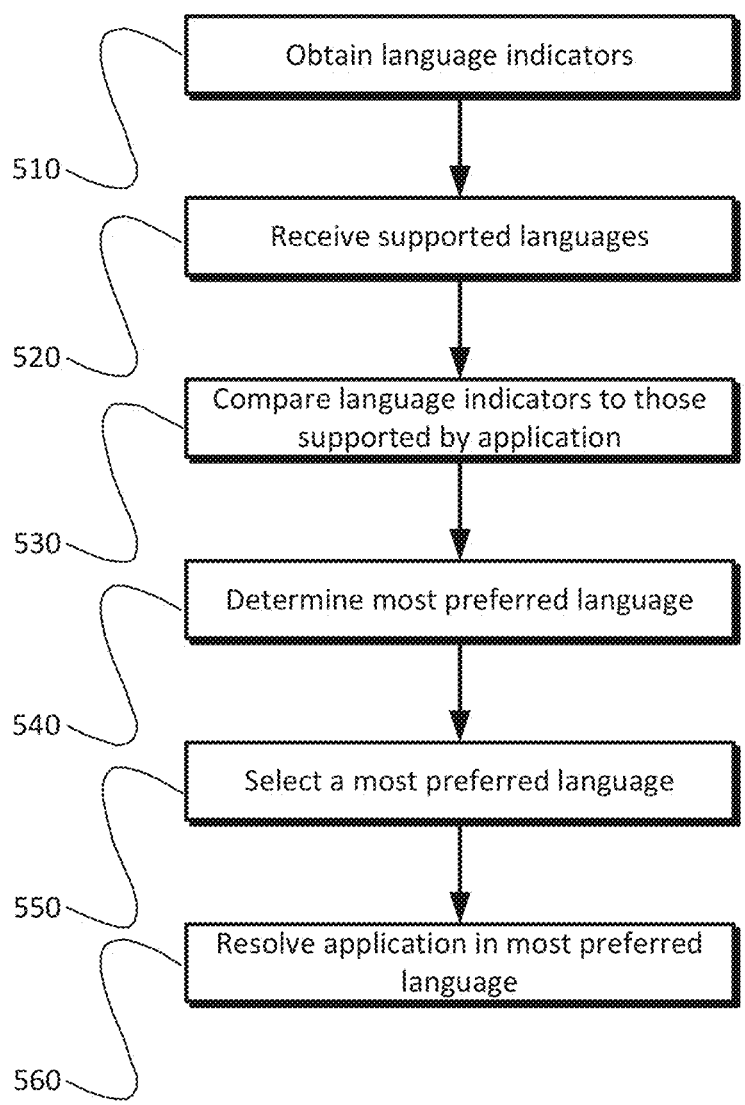
FIG. 5 shows an example process for a language selection using language indicators according to an embodiment of the disclosed subject matter.

FIG. 5 shows another example process for a language selection using language indicators according to an embodiment of the disclosed subject matter. An ordered list of language indicators may be obtained at 510. The ordered list may, for example, rank each language indicator according to a priority of the language indicator for determining a most-preferred language for a user. Each of the language indicators may be user defined or system defined. A list of languages available in an application may be received at 520. The ordered list of language indicators may be compared to the received languages at 530. A highest-ranked language indicator may be determined at 540 from the ordered list of language indicators based upon the comparison of the ordered list of language indicators to the received languages. The most-preferred language for the user may be selected based upon the highest-ranked language indicator at 550. Information from the application may be provided to the user in the most preferred language at 560.

In an embodiment of the disclosed subject matter, a database may store a plurality of language identifiers. A processor in connection with the database may be configured to receive a plurality of language indicators, each of which may be either user defined or system defined. The processor may be configured to determine languages available for an application and compare the plurality of language indicators to the languages available for an application. The processor then may determine a most preferred language based upon the comparison, and provide information from the application to the user in the most preferred language.

As used herein, an application may be described as being resolved or provided to a user, or as providing information to a user. It will be understood that such description may refer to functional portions of an application being made available to a user, and to information generated by or used in conjunction with the application being provided to the user. Providing an application or information from an application to a user may include providing a user interface, functional elements, descriptive elements, executable program components, or any combination thereof to a user.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   obtaining an ordered list of language indicators, the ordered list ranking each language indicator according to a priority of the language indicator for determining a most-preferred language for a user, wherein each of the language indicators is either user defined or system defined;
   receiving a list of languages available in an application;
   comparing the ordered list of language indicators to the received list of languages;
   determining, by a processor, a highest-ranked language indicator from the ordered list of language indicators based upon the step of comparing the ordered list of language indicators to the plurality of received list of languages;
   selecting the most-preferred language for the user based upon the highest-ranked language indicator; and
   providing information from the application to the user in the most preferred language.

2. A computer-implemented method comprising:
   receiving a plurality of language indicators, wherein each of the plurality of language indicators is either user defined or system defined;
   determining languages available for a first application;
   comparing the plurality of language indicators to the languages available for the first application;
   determining, by a processor, a most preferred language based upon the comparing of the plurality of language indicators to the languages available for the first application; and
   providing information from the first application to the user in the most preferred language.

3. The method of claim 2, wherein the plurality of language indicators includes general language preferences of the user, the general language preferences comprising an ordered list of language preferences of the user.

4. The method of claim 2, wherein the plurality of language indicators includes an application-specific language override of the user.

5. The method of claim 2, wherein the plurality of language indicators includes one or more application-specific overrides of the user for a second application separate from the first application.

6. The method of claim 2, wherein the plurality of language indicators includes an enterprise administrator language policy setting.

7. The method of claim 3, wherein the ordered list of language preferences of the user are associated with an application identifier.

8. The method of claim 2, further comprising:
   associating the most preferred language with a user identifier; and
   storing the most preferred language and user identifier on a computer readable medium.

9. The method of claim 2, wherein the plurality of language indicators includes a system defined language indicator selected from the group consisting of: URL parameter, IP address, browser defined language, cookie, or user agent.

10. A system comprising:
    a database storing a plurality of language identifiers;
    a processor in connection with said database, said processor configured to:
       receive a plurality of language indicators, wherein each of the plurality of language indicators is either user defined or system defined;
       determine languages available for a first application;
       compare the plurality of language indicators to the languages available for the first application;
       determine a most preferred language based upon the comparing of the plurality of language indicators to the languages available for the first application; and
       provide information from the first application to the user in the most preferred language.

11. The system of claim 10, wherein the plurality of language indicators includes general language preferences of the user, the general language preferences comprising an ordered list of language preferences of the user.

12. The system of claim 10, wherein the plurality of language indicators includes an application-specific language override of the user.

13. The system of claim 10, wherein the plurality of language indicators includes one or more application-specific overrides of the user for a second application separate from the first application.

14. The system of claim 10, wherein the plurality of language indicators includes an enterprise administrator language policy setting.

15. The system of claim 11, wherein the ordered list of language preferences of the user is associated with an application identifier.

16. The system of claim 10, further comprising:
    associating the most preferred language with a user identifier; and
    storing the most preferred language and user identifier on a computer readable medium.

17. The system of claim 10, wherein the plurality of language indicators includes a system defined language indicator selected from the group consisting of: URL parameter, IP address, browser defined language, cookie, or user agent.

18. A computer-implemented method comprising:
    receiving a plurality of language indicators, wherein each of the plurality of language indicators is either user defined or system defined, the plurality of language indicators including an application-specific language override specifying a first language for a first application;
    determining languages available for a second application;
    comparing the plurality of language indicators to the languages available for the second application;
    determining a most preferred second language based upon the comparing of the plurality of language indicators to the languages available for the second application;
    providing information from the first application to the user in the first language; and
    providing information from the second application to the user in the most preferred second language.

19. The method of claim 18, further comprising:
    associating the most preferred second language with a user identifier;
    storing an indication of the most preferred second language and the user identifier on a computer readable medium.

* * * * *